United States Patent [19]

Ellis

[11] 4,407,564
[45] Oct. 4, 1983

[54] HEAD-UP DISPLAYS
[75] Inventor: Stafford M. Ellis, East Preston, England
[73] Assignee: Elliott Brothers (London) Limited, Essex, England
[21] Appl. No.: 237,401
[22] Filed: Jan. 21, 1981
[30] Foreign Application Priority Data

Jan. 22, 1980 [GB] United Kingdom ............... 8002127

[51] Int. Cl.³ .................. G02B 27/14; G02B 5/32; G03H 1/30
[52] U.S. Cl. ............................. 350/174; 350/3.7; 350/3.77
[58] Field of Search ............... 350/174, 3.7, 3.77
[56] References Cited

U.S. PATENT DOCUMENTS 3,892,474  7/1975  Nilsson ........................... 350/174
3,940,204  2/1976  Withrington ..................... 350/174
4,261,647  4/1981  Ellis .............................. 350/174

Primary Examiner—S. C. Buczinski
Attorney, Agent, or Firm—Kirschstein, Kirschstein, Ottinger & Cobrin

[57] ABSTRACT

A display unit for a head up display wherein the combiner (9), which serves to reflect light from a display surface (3) towards an observer to provide the observer with an image of the display superimposed on his view through the combiner, comprises first, second and third tuned reflective optical films (13c, 15c, 17c) disposed in such angular relationship with one another and the display surface that narrow waveband light from the display surface reaches the observer after being, successively, reflected at the first film, transmitted through the second film, reflected at the third film, reflected at the second film and transmitted through the third film.

6 Claims, 5 Drawing Figures

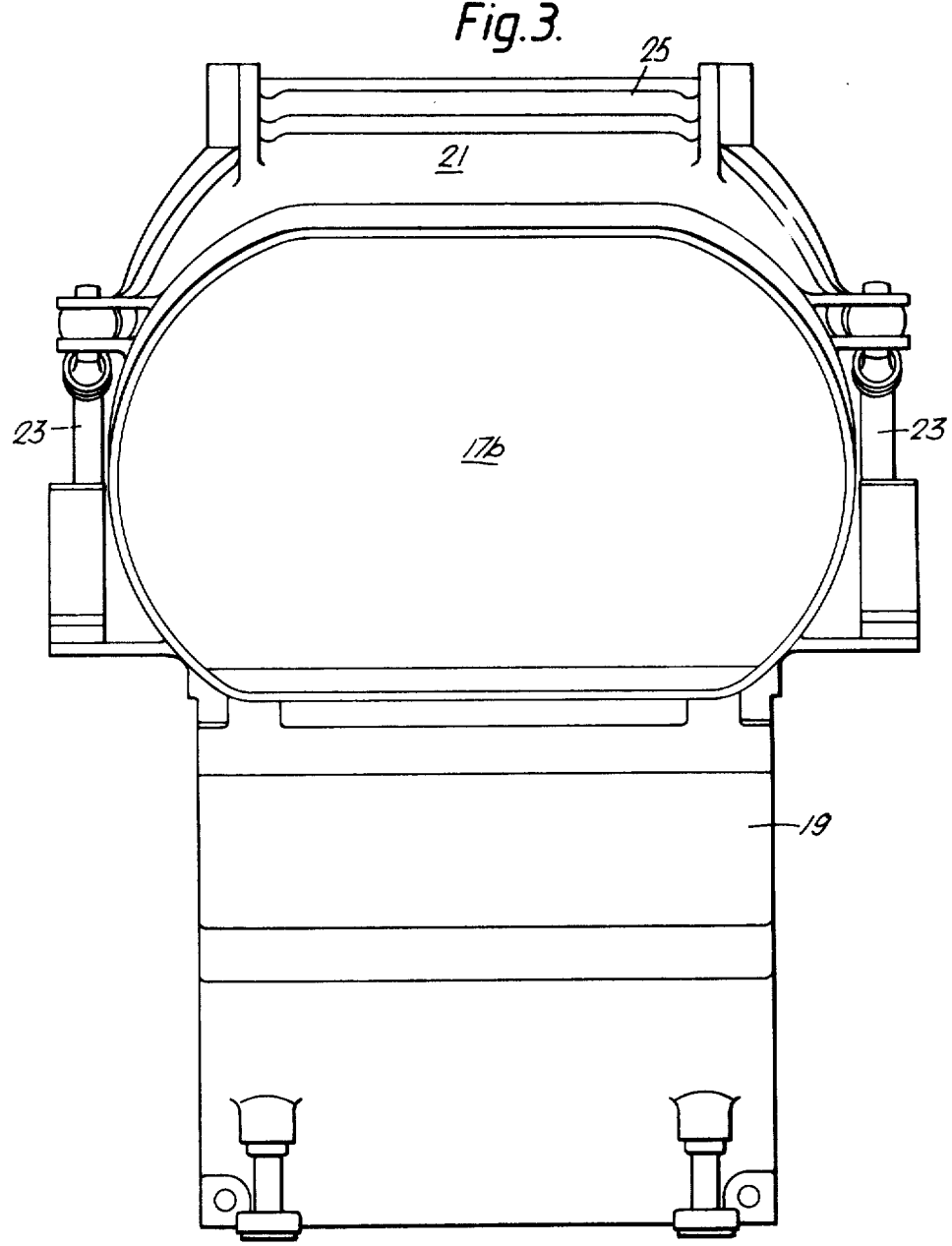

HEAD-UP DISPLAYS

This invention relates to head up displays and, more especially, to display units for such displays.

Such units comprise a combiner through which an observer can view a scene and a projector unit having a display surface from which light representing a display is projected onto the combiner for reflection to the observer thereby to provide the observer with an image of the display superimposed on his view through the combiner.

U.S. Pat. No. 3,940,204 discloses a display unit for a head up display which comprises a combiner in the form of a tuned reflective optical film lens of the holographic type; a projector unit comprising a generally planar narrow waveband light emitting display surface such, for example, as a cathode ray tube screen; a folding prism; and between the display surface and the prism a relay lens optical system.

Narrow waveband, e.g. green light from the display surface is transmitted by the optical system to the prism. The prism is located below the line of sight of the observer to the lower edge of the holographic lens. Light incident on the prism is reflected upwardly to the holographic lens from whence it is reflected to the observer's eye position.

Collimation of the image of the display is effected substantially wholly by the holographic lens which transmits without significant attenuation light incident thereon from the distant scene upon which the virtual display image appears superimposed.

The presence of axial coma and astigmatism, particularly pronounced in an off-axis system such as that mentioned, dictates the provision of coma and astigmatism correcting means and optical power correction means in the optical relay system and this in turn gives rise to severe packaging problems, especially with units for use in a confined space such as an aircraft cockpit.

It is an object of the present invention to provide a head up display unit using tuned reflective films wherein the problems associated with providing such correcting means are alleviated.

The present invention provides a display unit for a head up display wherein the combiner has first, second and third tuned reflective optical films which converge towards one another so as to define a pair of tapering spaces; the reflection/transmission characteristics of the films and the angles of convergence of the films and their angular relationship with the display surface being such that light within a narrow waveband from the display surface is, in turn, reflected at the first film towards the second film, transmitted through the second film towards the third film, reflected at the third film back towards the second film, reflected at the second film towards the third film, and transmitted through the third film to the observer's viewing position.

The films are suitably of the holographic type, but multilayer films or indeed any film construction which exhibits the required transmission/reflection characteristics may be employed.

The unit provided by the invention is, as is the prior art arrangement referred to previously, an off-axis optical system, but as a result of the configuration of the films and the display surface, the angle of departure from an axial system can be significantly less than that which obtains in the prior art. Accordingly the amount of correction needed to avoid displayed image defects is substantially less than in the prior art unit.

By a tuned reflective optical film is meant an optical film or similar optical element having the property of reflecting efficiently light at particular combinations of wavelength and incidence angle. The film is described as tuned to these combinations of wavelength and incidence angle. Light which does not satisfy the tuned condition is transmitted by the film with little reflection loss.

One display unit in accordance with the invention will now be described, by way of example, with reference to the accompanying drawings in which:

FIG. 3 is an end elevational view of the unit of FIG. 2; and

Figure 1:
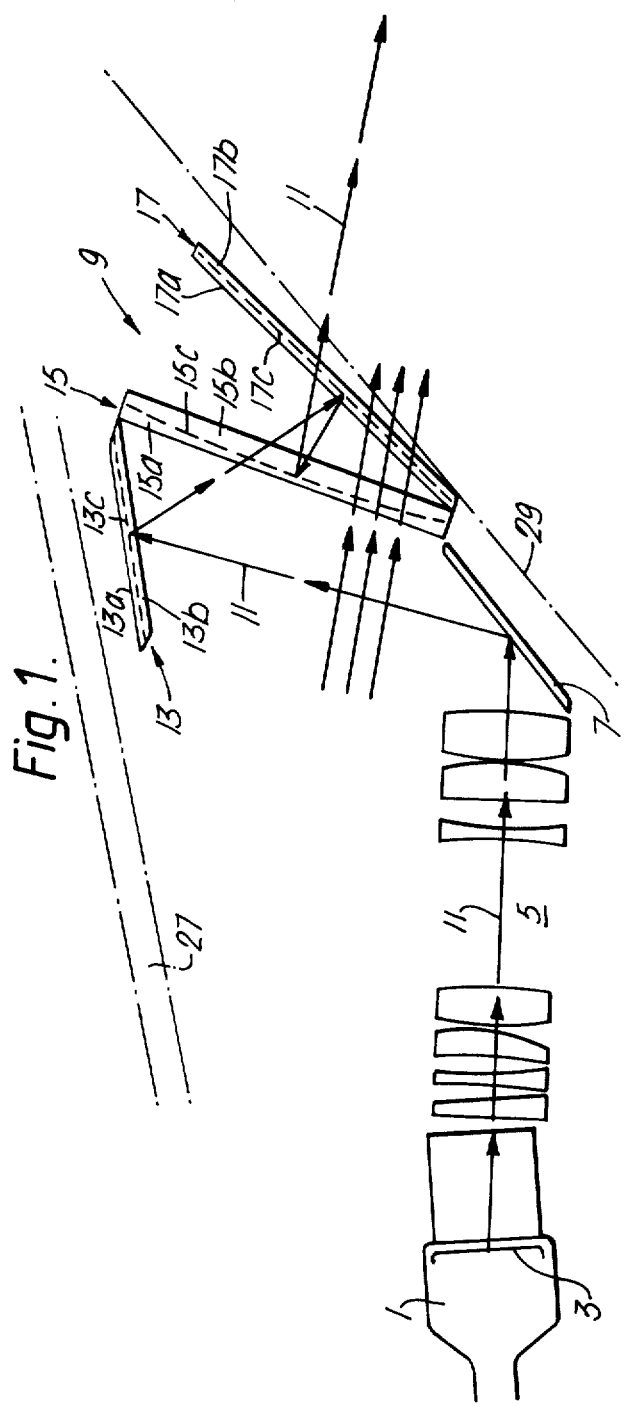
FIG. 1 is a diagrammatic representation of the display unit, illustrating its operation.

Referring to FIG. 1, the display unit comprises a cathode ray tube (CRT) 1 whose screen 3 is coated with a narrow waveband 'green' light emitting phosphor. Light rays emitted by the CRT screen pass through a relay lens system 5 to be reflected by a reflector 7 to a combiner 9, a single light ray 11 only being shown in FIG. 1, for clarity. The relay lens system 5 is disposed on the side of the combiner 9 remote from the observer's viewing position and extends generally parallel to the observer's line of sight through the combiner 9.

The combiner 9 comprises a first member 13 provided with a first holographic film 13c, a second member 15 provided with a second holographic film 15c and a third member 17 provided with a third holographic film 17c. The member 15 is between the members 13 and 17 with its top edge adjacent the member 13 and its bottom edge adjacent the member 17, and the reflector 7, the members 13 and 15 converging towards the top edge of the member 15 to define a tapering space and the members 15 and 17 converging towards the bottom edge of the member 15 to define a tapering space. As may be seen the members 13, 15 and 17 each consist of two glass elements 13a, 13b, 15a, 15b, or 17a, 17b; between which is sandwiched the associated holographic film 13c, 15c or 17c.

The spatial relationship between the members 13, 15 and 17 and, in particular, their films 13c, 15c and 17c and the spatial relationship between the films 13c, 15c, 17c, the relay lens system 5, the reflector 7 and the screen 3 of the CRT 1 is such that the narrow waveband 'green' light from the CRT screen 3 is in turn reflected at the film 13c, transmitted through the film 15c, reflected at the film 17c back to the film 15c, reflected at the film 15c and transmitted through the film 17c to the observer's viewing position.

Of the rays incident on the film 13c from each point on the CRT screen 3, only these rays which fall within a narrow conical ray bundle whose rays make with the film 13c an angle which falls within the reflective angular range of that film are reflected at film 13c. Rays outside each such conical bundle are transmitted by the film 13c, but are not received by the observer's eyes because they pass outside the range of head movement permitted to the observer.

The rays selectively reflected at the film 13c through film 15c are incident on the holographic film 17c. Once again, only the rays from each reflection point of the film 13c which fall within a narrow conical ray bundle whose rays make an angle with the coating 17c falling within the reflective angle range of that film, are reflected, and this similarly occurs at film 15c to which such rays are reflected. The rays reflected at film 15c are incident on the film 17c; but this time their angles of incidence fall outside the reflective range of the film 17c and, as a result, the rays reflected by the film 15c are transmitted by the film 17c to a small range of positions around the observer's design eye position.

The observer is thus provided with an image of the display presented on the CRT screen 3 superimposed on his view through the members 13, 15 and 17 of the combiner.

As shown in FIG. 1 the film 15c is spherical and the members 13 and 17 and their films 13c and 17c are flat. The observer views the scene on which the display appears superimposed by way of the two films 15c and 17c or all three films 13c, 15c and 17c.

In either case it is the function of the film 15c to produce a virtual image at infinity of the display presented on the CRT screen 3 so that such display may be viewed while the observer's eyes are focussed on the distant scene through the films 15c and 17c or 13c, 15c and 17c. It will be appreciated that the films 13c, 15c and 17c all transmit light from the distant scene without any significant attenuation, except of light in the narrow 'green' waveband of the CRT screen phosphor.

The possibility of the film 15c being spherical arises as a result of the relatively small departure of the optical system at the film 15c from an on-axis system. The necessary corrections to compensate for defects arising in the unit from the off-axis configuration of the optical system are, of course, effected by the relay lens system 5, but since the unit has a more nearly on-axis optical configuration than comparable prior art display units, the system 5 is relatively simple and compact.

Figure 2:
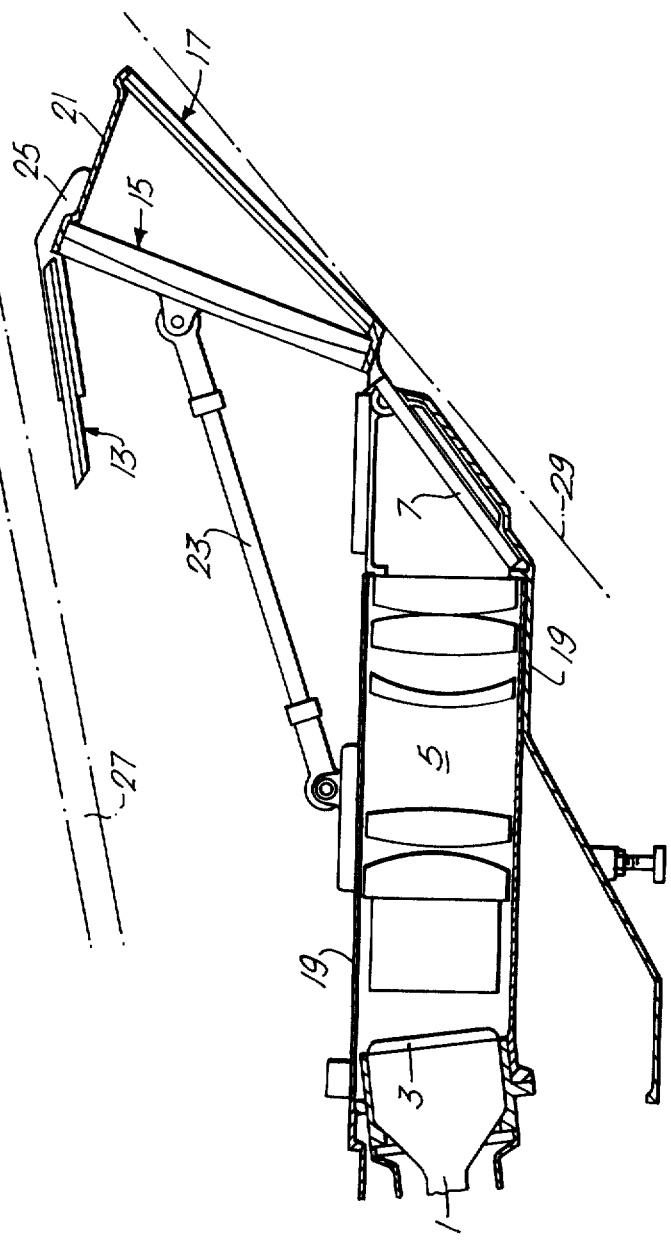
FIG. 2 is a side sectional view of a practical embodiment of the display unit of FIG. 1.

Referring now to FIGS. 2 and 3 there is shown a practical embodiment of a head up display unit utilising the optical system described with reference to FIG. 1.

In this embodiment the CRT 1, relay lens system 5 and reflector 7 are all located in a longitudinally extending casing 19. The members 15 and 17 are located at each side of an elliptical housing 21 attached to casing 19 at its lowermost position and additionally supported by adjustable length struts 23 at each side thereof. The member 13 is carried by a support member 25 attached at the top rear of housing 21.

As indicated in FIGS. 1, 2 and 3 of the drawings, the head up display unit described by way of example is adapted for use by a pilot in an aircraft cockpit with the unit supported between the aircraft canopy 27 and an ejection line 29.

Figure 4A:
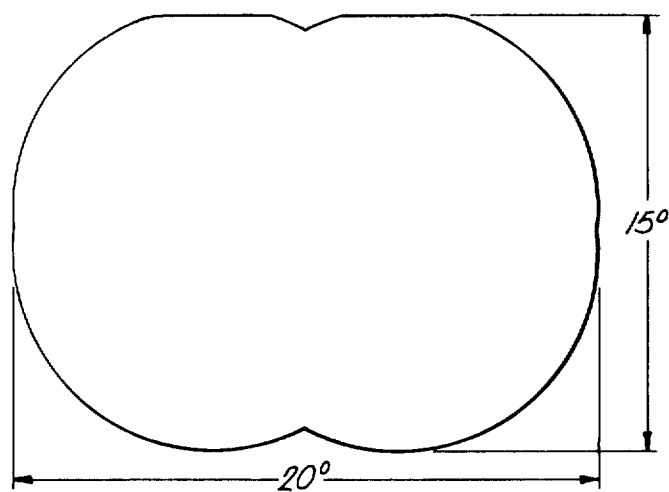
FIG. 4 illustrates the field of view obtainable with the unit of FIGS. 2 and 3.
Figure 4B:
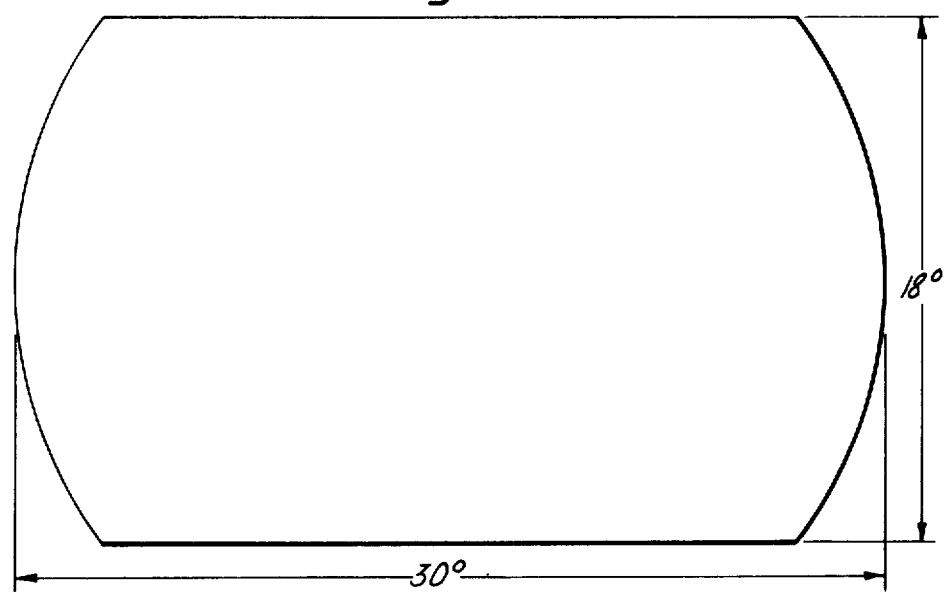

A typical field of view available to the observer at the design eye position using the display unit of FIGS. 2 and 3 is shown in 4B, FIG. 4A showing by way of comparison the maximum field of view obtainable using conventional head up display unit techniques.

It will be appreciated that in particular cases the angular relationships between the several active components of a display unit according to the invention may differ from those shown by way of example. The specific example illustrated is optimized for a particular set of spatial constraints; and, as may be gathered, these constraints will vary within certain limits from case to case, in particular in respect of tolerance to pilot's eye position.

I claim:

1. A display unit for a head up display comprising a combiner through which an observer can view a scene and a projector unit having a display surface from which light representing a display is projected onto the combiner for reflection to the observer thereby to provide the observer with an image of the display superimposed on his view through the combiner, characterised in that the combiner has first, second and third tuned reflective optical films which converge towards one another so as to define a pair of tapering spaces; the reflection/transmission characteristics of the films and the angles of convergence of the films and their angular relationship with the display surface being such that light within a narrow waveband from the display surface is, in turn, reflected at the first film towards the second film, transmitted through the second film towards the third film, reflected at the third film back towards the second film, reflected at the second film towards the third film, and transmitted through the third film to the observer's viewing position.

2. A display unit according to claim 1 wherein said second film is between said first and third films and said first and second films converge towards one edge of the second film and said second and third films converge towards the opposite edge of the second film.

3. A display unit according to claim 2 wherein light from said projector unit is directed onto said first film by a reflector disposed adjacent said opposite edge of the second film.

4. A display unit according to claim 3 wherein light from the projector unit is directed onto said reflector through a relay lens system disposed on the side of the combiner remote from the observer's viewing position and extending generally parallel to the observer's line of sight through the combiner.

5. A display unit according to claim 1 wherein said first and third films are substantially flat and said second film is substantially spherical.

6. A display unit according to claim 1 wherein each said film is sandwiched between a pair of supporting light transparent elements.

* * * * *